Oct. 31, 1933.     E. J. W. RAGSDALE     1,933,484

METHOD OF WELDING

Filed April 14, 1932

INVENTOR
Earl J. W. Ragsdale
BY John P. Tarbox
ATTORNEY

Patented Oct. 31, 1933

1,933,484

UNITED STATES PATENT OFFICE 1,933,484

METHOD OF WELDING

Earl J. W. Ragsdale, Norristown, Pa., assignor to Edward G. Budd Manufacturing Company, Philadelphia, Pa., a corporation of Pennsylvania Application April 14, 1932. Serial No. 605,240

8 Claims. (Cl. 219—10)

This invention relates to welding and more especially to welding processes.

The primary object of my invention is to obtain a method of welding which will result in the elimination of defective joints where a metal part or parts is welded to another composite part comprising a pre-welded structure of multiple thickness.

The method of my invention has been found to be exceptionally useful in spot welding processes where I have found that there is no practical limit to the number of thicknesses which can be spot welded together.

I have found that it is impossible to do this if any of the thicknesses have been previously welded since the welding renders the joined sheets inflexible and contact becomes uncertain. When the current can focus, a weld results but when it has a divergent path through the sheets the requisite current density may not obtain throughout the many layers and although recorders indicate large currents and the surface discoloration confirms the recorder, no weld results.

To obtain a good weld where a third thickness is to be secured to a prewelded composite part for example, I omit the welds in the composite part where the third thickness becomes local so that a three-thickness weld shall obtain through new metal. In other words, I weld the composite part outside of the local area, and subsequently weld the assembled parts through the local area. Still another way of stating the method is that I weld a metal part or parts to the pre-welded multiple thickness metal part or parts in locations spaced from the welds in the pre-welded parts.

My invention will be better understood from the following description when considered in connection with the accompanying drawing.

In the drawing wherein like ordinals represents corresponding parts in the various figures.

Figure 1:
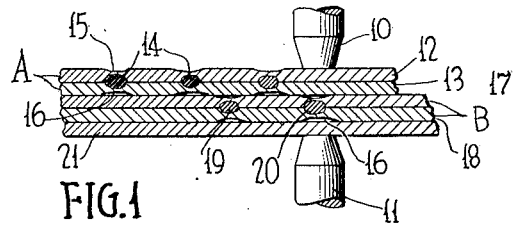
Fig. 1 is a cross section through a joint where the weld has not obtained.
Figure 3:
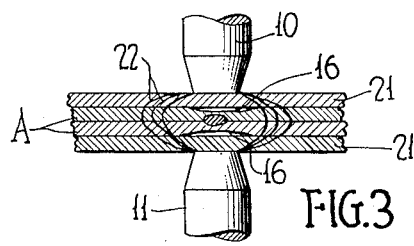
Fig. 3 illustrates the passage of current in a divergent path through an attempted joint.

In spot welding where I find an especially important application of my invention, the difficulty which I overcome is illustrated in Figures 1 and 3. The electrodes 10 and 11 placed upon opposite sides of the intended joint do not have new metal for the complete circuit in the parts to be welded. The composite member A made up of two thicknesses of metal 12 and 13 is prewelded as indicated by the various consecutive spot welds 14. It is obvious that the composite member A may be formed from thin sheet metal members secured by any of several modes of welding, as for example, spot welding or line welding. Likewise the proximity of the various spot welds 14 may not be so close as shown, but may be separated for a greater distance, the section illustrated being merely a part of a larger part of the structure not shown for purposes of simplicity. Upon either face of the composite member A are shown slight indentations 15 and 16 which are commonly found adjacent the welds. Positioned below the member A is a composite member B likewise comprising a plurality of sheet metal elements 17 and 18 with a plurality of spot welds 19 and 20. The lowermost member 21 is of a single thickness and may correspond to a localized area of a large structure. When the welding current is supplied under such circumstances the depressions 16 in the circuit between the two electrodes necessarily form gaps and the current takes a divergent path as illustrated by the circuitous lines 22 of Fig. 3. Herein I have shown two single thickness members 21 on opposite sides of a composite member A. Although this illustration is composed of a slightly different order of parts the resultant effect is substantially the same as in Fig. 1. Obviously under these circumstances the current density prerequisite of a good weld is not obtained and the resultant joint is either extremely defective or entirely absent.

Figure 2:
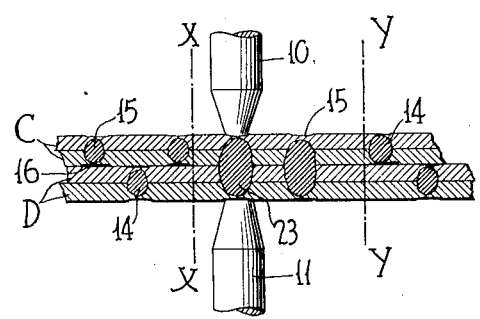
Fig. 2 is a cross section of a joint where the weld has obtained.

Incorporating the method of my invention as herein disclosed I have illustrated a joint formed according to the same in Fig. 2 wherein the welds 14 of the composite members C and D are omitted between the areas X—X and Y—Y that is, the composite members are welded outside of the local areas designated by the section lines. Instead of a plurality of small spot welds 14 in the composite members of this area they are joined as by a large spot weld 23 through the new metal and thus form a good joint between the four thicknesses as shown.

Figure 4:
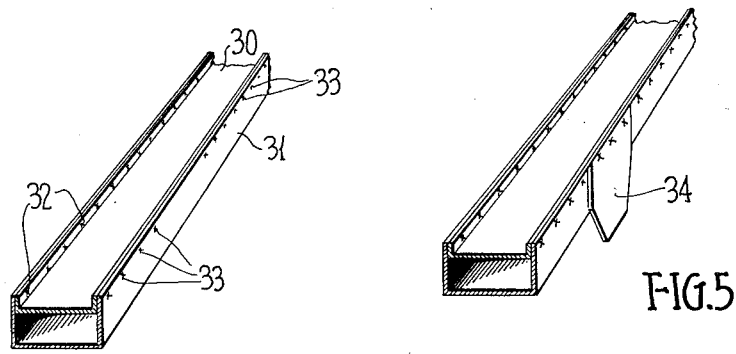
Fig. 4 illustrates a structural member prewelded for the joint.

Making use of the previously described method there is shown in Fig. 4 a section of a spar or beam in perspective composed of two channel shaped members, one member 30 telescoping within the other member 31 and being spot welded adjacent their substantially co-extensive edges by means of a plurality of consecutive individual spot weld 32 and 33. Upon the right-hand side of the spar, wherein a gusset plate becomes local with respect to the spar member, I have omitted the welds 33 to provide substantially midway of the section illustrated new metal at the time of welding the joint in that area. I mean by "becomes local" that the part of the member which is to be secured to the composite member is to be secured in at least a relatively small area relative to the entire composite member to which it is fastened that is, the assembled parts are welded through areas of the composite parts wherein the welds were omitted, or through areas of the composite parts spaced from the welds in the pre-welded composite structure.

Figure 5:
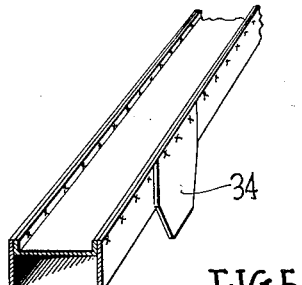
Fig. 5 shows a gusset plate or similar member united to the structural member in final condition.

Fig. 5 shows a resulting joint obtained after the gusset plate 34 has been placed in the area wherein the spot welds were omitted and the three thicknesses of metal have been welded together giving the integral three-thickness joint desired.

It is quite obvious that the invention herein disclosed is not limited to a three-thickness joint or to a joint formed by two composite members, but numerous and sundry variations of the same will be apparent to persons working in structural metal arts.

The various modifications of which my invention is susceptible I aim to cover by the hereto appended claims.

What I claim is:

1. The method of welding a metal part or parts to prewelded multiple thickness metal parts where the parts become local which comprises welding the multiple parts outside the local area and subsequently welding the assembled parts through the local area.

2. The method of spot welding a metal part or parts to prewelded multiple thickness metal parts where the parts become local which comprises spot welding the multiple parts outside the local area and subsequently spot welding the assembled parts through the local area.

3. The method of spot welding a metal part or parts to prewelded multiple thickness metal parts where one of the parts becomes local which comprises spot welding the multiple parts outside the local area and subsequently welding through the local area to include the local and multiple parts.

4. The method of spot welding metal parts to prewelded multiple thickness metal parts where one of the parts becomes local which comprises consecutively spot welding the multiple thickness part or parts outside the local area and subsequently spot welding through the local area to include the local and multiple parts.

5. The method of spot welding a metal part or parts to prewelded multiple thickness metal parts where one or more of the parts become local which comprises spot welding the multiple parts outside the local area and subsequently spot welding the assembled parts through the local area.

6. The method of spot welding a metal part or parts to pre-welded multiple thickness metal parts, which consists in welding the metal part or parts to the pre-welded multiple thickness metal part or parts in locations spaced from the welds in the pre-welded structure.

7. The method of spot welding together more than two overlapped metal parts which consists in first spot welding together two or more parts in localized areas, and thereafter spot welding one or more parts to said pre-welded parts in locations spaced from the welds in the pre-welded structure.

8. A resistance welded metal structure comprising a multiple number of contiguous metal parts, greater than two, spot welded together, comprising multiple thickness metal parts spot welded together locally, and one or more other metal parts spot welded to said prewelded multiple thickness parts where all the parts are local in common, the spot welds in the local common area passing through all of said parts and through areas of the prewelded multiple parts in locations spaced from the prewelded areas local solely to the multiple part.

EARL J. W. RAGSDALE.